United States Patent
Kang

(10) Patent No.: US 11,799,138 B2
(45) Date of Patent: Oct. 24, 2023

(54) APPARATUS FOR DETECTING THERMAL RUNAWAY OF BATTERY FOR ELECTRIC VEHICLE

(71) Applicants: HYUNDAI MOTOR COMPANY, Seoul (KR); KIA CORPORATION, Seoul (KR)

(72) Inventor: Hyunchang Kang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 144 days.

(21) Appl. No.: 17/365,342

(22) Filed: Jul. 1, 2021

(65) Prior Publication Data

US 2022/0045371 A1 Feb. 10, 2022

(30) Foreign Application Priority Data

Aug. 7, 2020 (KR) .................. 10-2020-0099419

(51) Int. Cl.
*H01M 10/42* (2006.01)
*H01M 10/48* (2006.01)

(52) U.S. Cl.
CPC ....... *H01M 10/425* (2013.01); *H01M 10/482* (2013.01); *H01M 10/486* (2013.01); *H01M 2010/4271* (2013.01); *H01M 2220/20* (2013.01)

(58) Field of Classification Search
CPC ............. H01M 10/425; H01M 10/482; H01M 10/486; H01M 2010/4271; H01M 2220/20
See application file for complete search history.

(56) References Cited

U.S. PATENT DOCUMENTS

| 8,695,740 | B1 | 4/2014 | Boddakayala et al. |
| 8,993,145 | B2 | 3/2015 | Muniz |
| 2012/0148890 | A1* | 6/2012 | Goto ............... H01M 10/482 429/90 |
| 2015/0037647 | A1* | 2/2015 | Nguyen ........... H01M 10/6555 429/120 |
| 2018/0015806 | A1 | 1/2018 | Yasuda et al. |
| 2018/0108955 | A1 | 4/2018 | Fees et al. |
| 2020/0086152 | A1* | 3/2020 | Stadler ................ B60L 58/24 |

(Continued)

FOREIGN PATENT DOCUMENTS

CN 110635182 * 12/2019
EP 3340337 A1 6/2018
(Continued)

OTHER PUBLICATIONS

JP_2003059484 Abstract (Year: 2003).*
(Continued)

*Primary Examiner* — Alexander Usyatinsky
(74) *Attorney, Agent, or Firm* — LEMPIA SUMMERFIELD KATZ LLC

(57) ABSTRACT

An apparatus for detecting a thermal runaway of a battery for an electric vehicle may include: an exterior case; a plurality of battery cells provided inside the exterior case; a sensing module provided in one of the plurality of battery cells and detecting deformation amount of the battery cell; and a printed circuit board transmitting a voltage and a temperature of the battery cell, and the deformation amount of the battery cell detected by the sensing module, to a battery management system.

4 Claims, 7 Drawing Sheets

(56) References Cited

U.S. PATENT DOCUMENTS

| | | |
|---|---|---|
| 2020/0263419 A1 | 8/2020 | Stahl, Jr. et al. |
| 2021/0320343 A1 | 10/2021 | Flannery |
| 2022/0013855 A1 | 1/2022 | Zhao et al. |
| 2022/0037715 A1 | 2/2022 | Kim |

FOREIGN PATENT DOCUMENTS

| | | | |
|---|---|---|---|
| JP | 2003059484 | * | 2/2003 |
| JP | 2013246920 A | | 12/2013 |
| JP | 5749200 B2 | | 7/2015 |
| JP | 6362300 B2 | | 7/2018 |
| JP | 2019-514191 A | | 5/2019 |
| JP | 2020-002979 A | | 1/2020 |
| KR | 20120052984 | * | 5/2012 |
| KR | 10-2013-0101889 A | | 9/2013 |
| KR | 10-2018-0114271 A | | 10/2018 |
| KR | 10-2019-0008728 A | | 1/2019 |
| KR | 10-2019-0022485 A | | 3/2019 |
| KR | 10-2019-0090992 A | | 8/2019 |
| KR | 10-2010012 B1 | | 8/2019 |
| KR | 10-2090405 B1 | | 3/2020 |
| WO | 2017-181283 A1 | | 10/2017 |

OTHER PUBLICATIONS

CN20120052984MT (Year: 2019).*
KR 20120052984MT (Year: 2012).*
Office Action cited in corresponding U.S. Appl. No. 17/096,038; dated Aug. 15, 2022; 16 pp.
Khan Academy, What is thermal conductivity?, Khan Academy, Dec. 9, 2015 (Year: 2015).
Office Action dated Jan. 25, 2023 cited in corresponding U.S. Appl. No. 17/387,739; 24 pp.
Office Action dated Dec. 22, 2022 cited in corresponding U.S. Appl. No. 17/096,038; 20 pp.
Office Action cited in corresponding U.S. Appl. No. 17/096,038; dated Jul. 24, 2023; 13 pp.

* cited by examiner

APPARATUS FOR DETECTING THERMAL RUNAWAY OF BATTERY FOR ELECTRIC VEHICLE

CROSS-REFERENCE TO RELATED APPLICATION

This application claims priority to and the benefit of Korean Patent Application No. 10-2020-0099419, filed on Aug. 7, 2020, the entire contents of which are incorporated herein by reference.

FIELD

The present disclosure relates to an apparatus for detecting a thermal runaway of a battery for an electric vehicle.

BACKGROUND

The statements in this section merely provide background information related to the present disclosure and may not constitute prior art.

An electric vehicle is a vehicle that uses a battery powered engine operated by electrical energy outputted from a battery.

Since such an electric vehicle uses a battery in which a plurality of secondary cells capable of being charged and discharged are formed as a single pack as a main power source, it has the advantage of no emissions and very little noise.

In addition, a hybrid vehicle is a vehicle that uses two or more power sources to propel the vehicle, for example, an internal combustion engine powered by fuel and an electric motor powered by a battery.

In the vehicle using electrical energy as described above, since performance of the battery directly affects performance of the vehicle, a battery management system is required to efficiently manage charging and discharging of each battery cell by measuring a voltage of each battery cell, and a voltage and current of an entire battery, and to ensure maximum performance of the battery cell by determining whether each battery cell is degraded.

Recently, the use of lithium-ion batteries in such electric vehicles is increasing. The lithium-ion battery is a type of rechargeable battery, and has a multilayer structure including a positive electrode activated by various mixed oxides or olivine, a negative electrode activated by a specific carbon, and a separator immersed in an organic electrolyte.

In a normal operation state thereof, electrical energy is converted and stored as chemical energy during charging, and the stored chemical energy is converted into electrical energy during discharging. In more detail, during charging, lithium in the positive electrode is ionized to move layer by layer toward the negative electrode. During discharging, ions move to the positive electrode to return to their original compound.

In such a lithium-ion battery, a state known as self-heating may occur in extreme situations of overvoltage, overcurrent, or overtemperature. Due to the self-heating, the lithium-ion battery may enter a thermal runaway state. The self-heating means a state in which a temperature inside a battery cell rises due to an electrical-chemical structure inside the battery cell.

When the thermal runaway occurs inside a battery module, it may cause very extreme and severe damage. When the thermal runaway occurs, a very little amount of oxygen may be generated and an internal temperature may rise to 800 degrees Celsius or more.

When such a situation occurs, a fire may occur inside the vehicle, excessive gas may be generated, or a case in which a lithium-ion battery cell is accommodated may be destroyed. Particularly, when a fire occurs, it may cause very serious damage to a driver in the vehicle.

The above information disclosed in this Background section is only for enhancement of understanding of the background of the present disclosure, and therefore it may contain information that does not form the prior art that is already known to a person of ordinary skill in the art.

SUMMARY

The present disclosure provides an apparatus for detecting a thermal runaway of a battery for an electric vehicle that may detect a thermal runaway of a battery for an electric vehicle and warn an occupant of the vehicle of a danger thereof.

An apparatus for detecting a thermal runaway of a battery for an electric vehicle according to an exemplary form of the present disclosure may include: an exterior case; a plurality of battery cells provided inside the exterior case; a sensing module provided in a battery cell of the plurality of battery cells and detecting deformation amount of the battery cell; and a printed circuit board transmitting a voltage of the battery cell, a temperature of the battery cell, and the deformation amount of the battery cell detected by the sensing module, to a battery management system.

The sensing module may be installed at a center of the outermost battery cell among the plurality of battery cells.

The sensing module may include a sensing portion for sensing the deformation amount of the battery cell; and a sensing line transmitting a value of the deformation amount sensed by the sensing portion to the printed circuit board.

A remained portion of the sensing module excluding the sensing portion may be attached to the battery cell.

The sensing module may be directly attached to the battery cell.

The sensing module may be implemented with a strain gauge.

The apparatus according to an exemplary form of the present disclosure may further include a controller that determines a thermal runaway of the battery cell based on the deformation amount of the battery cell transmitted through the printed circuit board; and a warning part that notifies an occupant of the electric vehicle of the thermal runaway related to the battery cell through an alarm (e.g., a visual alarm or a sound alarm) when the thermal runaway occurs in the battery cell.

According to the apparatus for detecting the thermal runaway of the battery for the electric vehicle according to the form of the present disclosure as described above, by detecting deformation amount of a battery cell through a sensing module, and predicting a thermal runaway of the battery cell through this, it is possible to provide information on whether or not a danger occurs to occupants of a vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
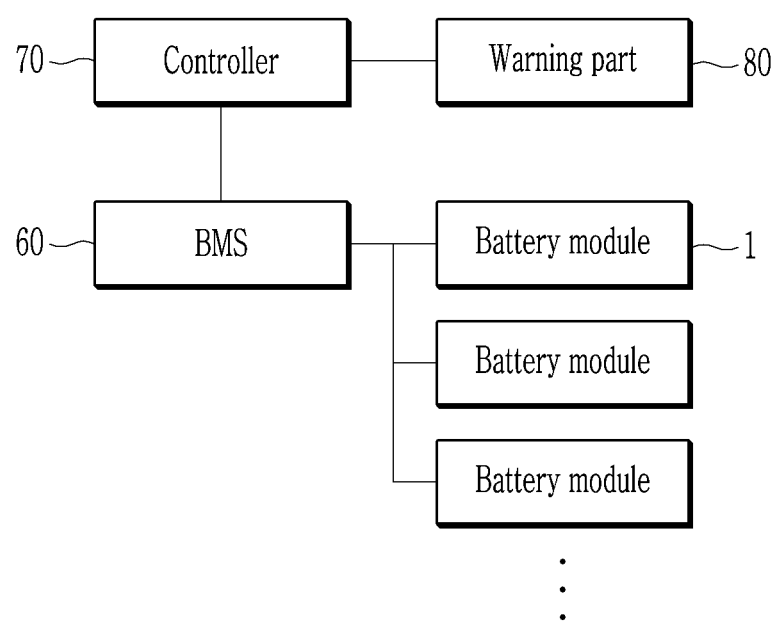
FIG. 1 illustrates a block diagram of an apparatus for detecting a thermal runaway according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

In order to clearly describe the present disclosure, parts that are irrelevant to the description are omitted, and identical or similar constituent elements throughout the specification are denoted by the same reference numerals.

In addition, since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Hereinafter, an apparatus for detecting a thermal runaway of a battery for an electric vehicle according to some forms of the present disclosure will be described in detail with reference to the accompanying drawings.

Figure 2:
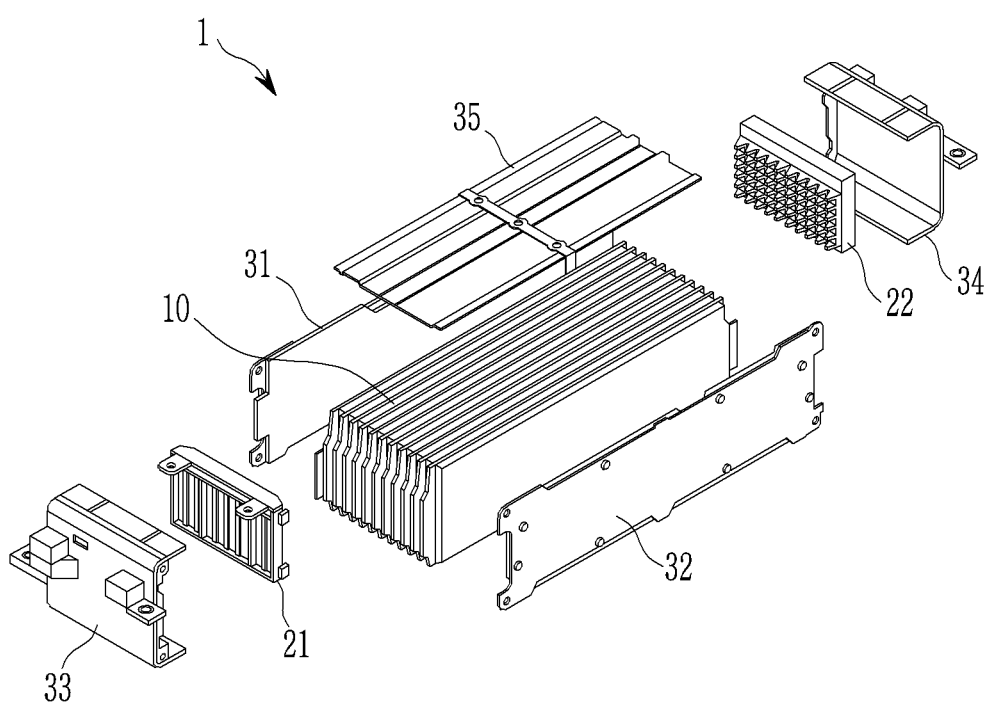
FIG. 2 illustrates an exploded perspective view of a battery pack according to an exemplary form of the present disclosure.
Figure 3:
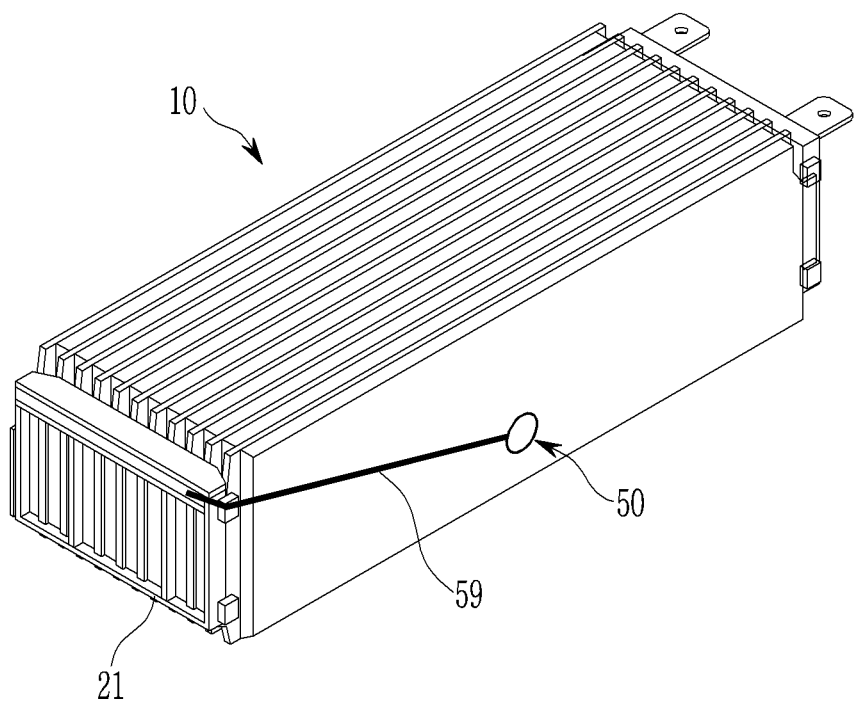
FIG. 3 illustrates a perspective view of a battery module according to an exemplary form of the present disclosure.

FIG. 1 illustrates a block diagram of an apparatus for detecting a thermal runaway according to an exemplary form of the present disclosure. FIG. 2 illustrates an exploded perspective view of a battery pack according to an exemplary form of the present disclosure. In addition, FIG. 3 illustrates a perspective view of a battery module according to another form of the present disclosure.

As shown in FIG. 1, an apparatus for detecting a thermal runaway of a battery for an electric vehicle may include a battery module 1, a controller 70, and a warning part 80.

Referring to FIG. 2, the battery module 1 may include a plurality of battery cells 10 and a printed circuit board (PCB) 20 that are provided in an exterior case 30.

The exterior case 30 may include a left cover 31, a right cover 32, an upper cover 35, a lower cover, a front cover 33, and a rear cover 34. The left cover 31, the right cover 32, the upper cover 35, the lower cover, the front cover 33, and the rear cover 34 are combined to form the exterior case 30, and the exterior case 30 is provided to surround an outer periphery of the plurality of battery cells 10, and the printed circuit board 20 is provided between the exterior case 30 and the plurality of battery cells 10.

The plurality of battery cells 10 are stacked in left and right directions, and the plurality of battery cells 10 are connected to in parallel and/or in series. The printed circuit boards 21 and 22 are provided at both ends of the plurality of battery cells 10 stacked in the left and right directions, and each printed circuit board 20 detects a voltage and temperature of each battery cell 10 to transmit them to a battery management system (BMS) 60.

The battery management system 60 receives battery information detected by various types of sensors (for example, a temperature sensor, a voltage sensor, etc.) through the printed circuit board 20 to determine a situation of a plurality of battery modules 1, and it manages each battery module 1 to be maintained in an optimal state.

Particularly, the battery management system 60 measures the remaining capacity of the battery, maintains a state of charge (SOC) of the battery at an appropriate level, and measures and manages a temperature of the battery.

The apparatus for detecting the thermal runaway may include a sensing module 50 provided in the battery cell.

Figure 4:
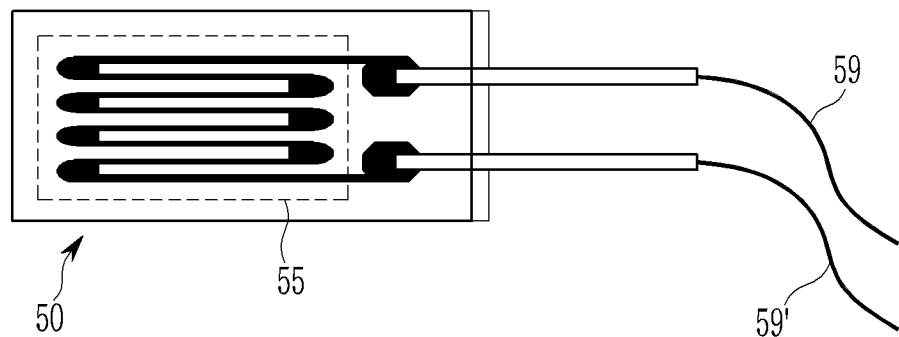
FIG. 4 illustrates a top plan view of a sensing module according to an exemplary form of the present disclosure.

FIG. 4 illustrates a top plan view of a sensing module according to an exemplary form of the present disclosure. In addition, FIG. 5 illustrates a side view of a sensing module according to another form of the present disclosure.

Figure 5:
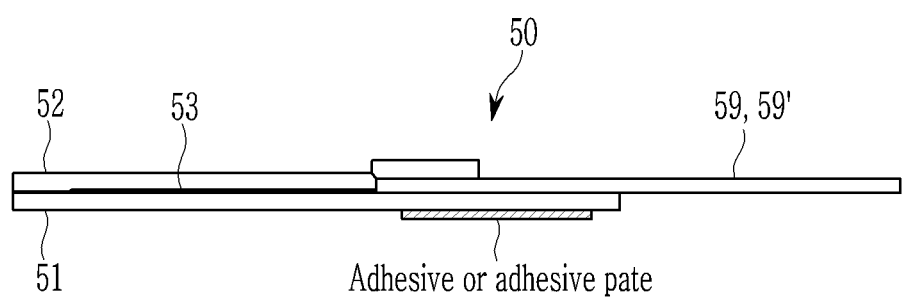
FIG. 5 illustrates a side view of a sensing module according to an exemplary form of the present disclosure.

As shown in FIG. 4 and FIG. 5, the sensing module 50 is provided in the battery module to measure a deformation amount of the battery cell 10.

The sensing module 50 for measuring the deformation amount of the battery according to an exemplary form of the present disclosure may be implemented with a strain gauge. However, the scope of the present disclosure is not limited thereto.

The sensing module 50 may be installed at a center of the outermost battery cell 10 among a plurality of battery cells 10 stacked in a predetermined direction (for example, left and right directions). As described above, when the sensing module 50 is installed at the center of the outermost battery cell 10 among the plurality of battery cells 10 and when the plurality of battery cells 10 are embedded in the exterior case 30, the sensing module 50 is pressed by the exterior case 30 so that the plurality of battery cells 10 and the exterior case 30 are coupled.

In a case where the sensing module is a strain gauge, the module 50 may include a lower plate 51, an upper plate 52, and a metal grid 53 disposed between the lower plate 51 and the upper plate 52. The sensing module may be divided into the sensing portion for sensing the deformation of the battery cell and a remained portion excluding the sensing portion. In the specification, the sensing portion may mean a region that the metal grid is disposed between the upper plate 52 and the lower plate 51.

The metal grid 53 of the sensing portion 55 is electrically connected to the printed circuit board through a sensing line 59 and 59', and a sensing signal sensed by the sensing portion 55 is transmitted to the printed circuit board through a sensing line 59 and 59'.

In the sensing portion 55, a very thin metal is disposed in grid form. When a deformation occurs in a measuring object on which the sensing module is installed, the metal grid 53 disposed in the grid form is deformed, thereby changing resistance value. Through this, the deformation amount of the battery cell may be sensed.

When the sensing module 50 is installed in the battery cell 10, the remained portion excluding the sensing portion 53 is attached to the battery cell 10 through an adhesive or adhesive tape. That is, the remained portion excluding the sensing portion 53 of the sensing module 50 is directly attached to the battery cell 10 through an adhesive or adhesive tape. As described above, by directly attaching the area excluding the sensing portion 53 of the sensing module 50 to the battery cell 10, it is possible to prevent noise from being inputted to the sensing portion 53 due to the adhesive or adhesive tape when the battery cell 10 is deformed.

In addition, when the battery cell 10 is accommodated in the exterior case 30, the sensing module 50 is pressed and fixed by the external case 30, so that the sensing module 50 may be stably attached to the battery cell 10, and may quickly detect the pressure of the battery cell 10.

In addition, since the sensing module 50 is installed at the center of the battery cell 10, it may quickly detect the deformation amount of the battery cell 10.

Meanwhile, the controller 70 may determine whether the battery cell 10 is thermally runaway from the deformation amount of the battery cell 10 transmitted from the printed circuit board 20 through the battery management system 60.

In one form, the controller 70 may be provided as at least one processor executed by a predetermined program, and the predetermined program is configured to perform respective steps of a method of detecting a thermal runaway of the battery cell 10 according to one form of the present disclosure.

Figure 6:
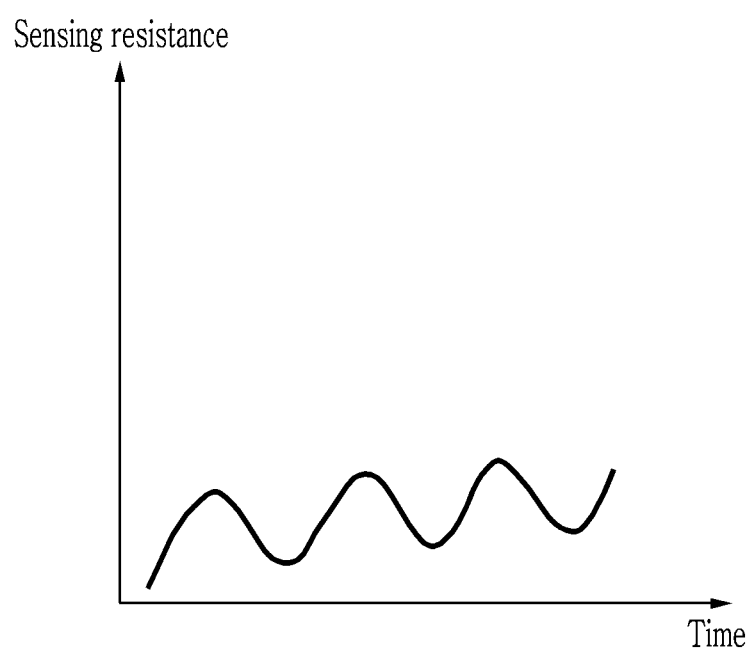
FIG. 6 and FIG. 7 illustrate graphs of a sensing signal according to some forms of the present disclosure.

When the battery cell 10 normally operates, the sensing signal (for example, resistance value) sensed by the sensing module 50 is varied within a certain range (see FIG. 6).

Figure 7:
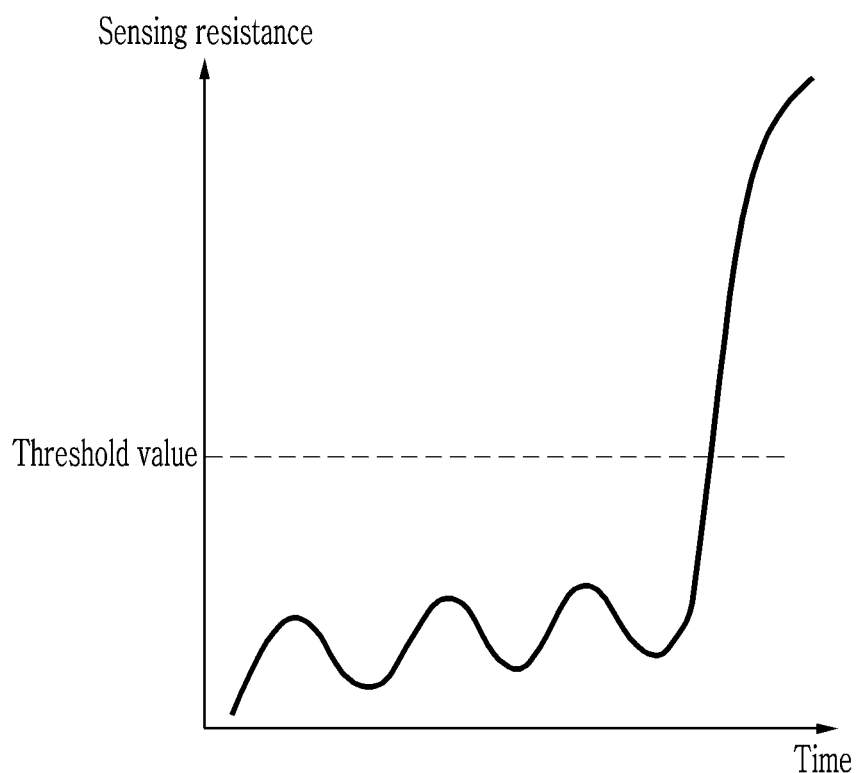

However, when the thermal runaway occurs in the battery cell 10, a swelling phenomenon in which the battery cell 10 swells occurs, thus the pressure of the battery cell 10 is changed, and accordingly, the sensing signal (pressure converted into a resistance value) sensed by the sensing module 50 goes out of a certain range and exceeds a threshold value (see FIG. 7). Through this, the controller 70 may determine that the thermal runaway occurs in the battery cell 10.

When the thermal runaway occurs in the battery cell 10, the controller 70 may generate an alarm to an occupant of the vehicle through the warning part 80. The warning part 80 may be implemented through a center fascia or speaker provided in the vehicle.

The thermal runaway occurs in the battery cell 10, resulting in the swelling phenomenon in which the battery swells, and in an extreme situation, gas may be generated from the battery, and a fire may occur. A very dangerous situation may occur for the occupants in the vehicle due to a cascade of fires in the vehicle due to the battery fire.

Accordingly, when the deformation amount of the battery cell 10 is detected through the sensing module 50 and the thermal runaway is predicted to occur in the battery cell 10, the controller 70 notifies the occupants of the vehicle of the situation through the warning part 80, so that it is possible to protect the occupants from the thermal runaway of the battery cell 10 and the resulting vehicle fire.

While this present disclosure has been described in connection with what is presently considered to be practical exemplary forms, it is to be understood that the present disclosure is not limited to the disclosed forms, but, on the contrary, is intended to cover various modifications and equivalent arrangements included within the spirit and scope of the present disclosure.

DESCRIPTION OF SYMBOLS

1: battery module
10: battery cell
20: printed circuit board
30: exterior case
31: left cover
32: right cover
33: front cover
34: rear cover
35: upper cover
50: sensing module
51: lower plate
52: upper plate
53: metal grid
55: sensing portion
59, 59': sensing line
60: battery management system
70: controller
80: warning part

What is claimed is:

1. An apparatus for detecting a thermal runaway of a battery for an electric vehicle, the apparatus comprising:
   an exterior case;
   a plurality of battery cells provided inside the exterior case;
   a sensing module provided in one battery cell of the plurality of battery cells and configured to detect a deformation amount of the one battery cell; and
   a printed circuit board configured to transmit a voltage of the one battery cell, a temperature of the one battery cell, and the deformation amount of the one battery cell detected by the sensing module, to a battery management system,
   wherein the sensing module includes:
      a lower plate;
      an upper plate;
      a sensing portion disposed between the lower plate and the upper plate and configured to sense the deformation amount of the one battery cell; and
      a sensing line configured to transmit a value of the deformation amount sensed by the sensing portion to the printed circuit board, and
   wherein the lower plate of the sensing module is directly attached to the one battery cell through an adhesive or adhesive tape.

2. The apparatus of claim 1, wherein the sensing module is installed at an outermost battery cell among the plurality of battery cells.

3. The apparatus of claim 1, wherein the sensing module is implemented with a strain gauge.

4. The apparatus of claim 1, further comprising:
   a controller configured to determine a thermal runaway of the one battery cell based on the deformation amount of the one battery cell; and
   a warning part configured to notify an occupant of the electric vehicle of the thermal runaway related to the one battery cell.

* * * * *